J. T. RAWSTHORNE & J. PRYKE.

PANTOGRAPH ENGRAVING MACHINE.

APPLICATION FILED JUNE 11, 1909. 2 SHEETS—SHEET 1.

Reissued July 13, 1909. 12,990.

WITNESSES.

E. Howard

Joseph Bates.

INVENTORS.

J. T. Rawsthorne

John Pryke by Owen O'Brien

Atty.

ANDREW. B. GRAHAM CO., PHOTO-LITHOGRAPHERS, WASHINGTON, D. C.

J. T. RAWSTHORNE & J. PRYKE.

PANTOGRAPH ENGRAVING MACHINE.

APPLICATION FILED JUNE 11, 1909. 2 SHEETS—SHEET 2.

Reissued July 13, 1909. 12,990.

WITNESSES.

E. Howard

Joseph Bates.

INVENTORS.

J. T. Rawsthorne

John Pryke by J. Owen O'Brien

Atty.

ANDREW. B. GRAHAM CO., PHOTO-LITHOGRAPHERS, WASHINGTON, D. C.

UNITED STATES PATENT OFFICE.

JOSEPH TWEEDALE RAWSTHORNE AND JOHN PRYKE, OF DINTING, ENGLAND.

PANTOGRAPH ENGRAVING-MACHINE.

No. 12,990. Specification of Reissued Letters Patent. Reissued July 13, 1909.

Original No. 921,736, dated May 18, 1909, Serial No. 396,251. Application for reissue filed June 11, 1909. Serial No. 501,680.

*To all whom it may concern:*

Be it known that we, JOSEPH TWEEDALE RAWSTHORNE and JOHN PRYKE, British subjects, and residents of Dinting, county of Derby, England, have invented certain new and useful Improvements in Pantograph Engraving-Machines, of which the following is a specification.

This invention relates to certain improvements in what are known as pantograph engraving machines such as described in the specification of Barr's patent No. 824,088 of 1906 in which a punch is employed at the back of the machine to indent a roller or die placed under it.

It is designed to enable the pantograph machine to be successfully employed for engraving rollers, dies or other metal cylinders varying with gradations of light and shade required in the pattern thereon.

The invention consists essentially in the application to or combination with the sliding punch weight of an adjusting rod projecting toward the front of the machine whereby the operator can regulate and adjust the weight to be applied to the punch without leaving his position at the table of the pantograph machine.

It will be fully described with reference to the accompanying drawings forming part of the specification.

Figure 1:
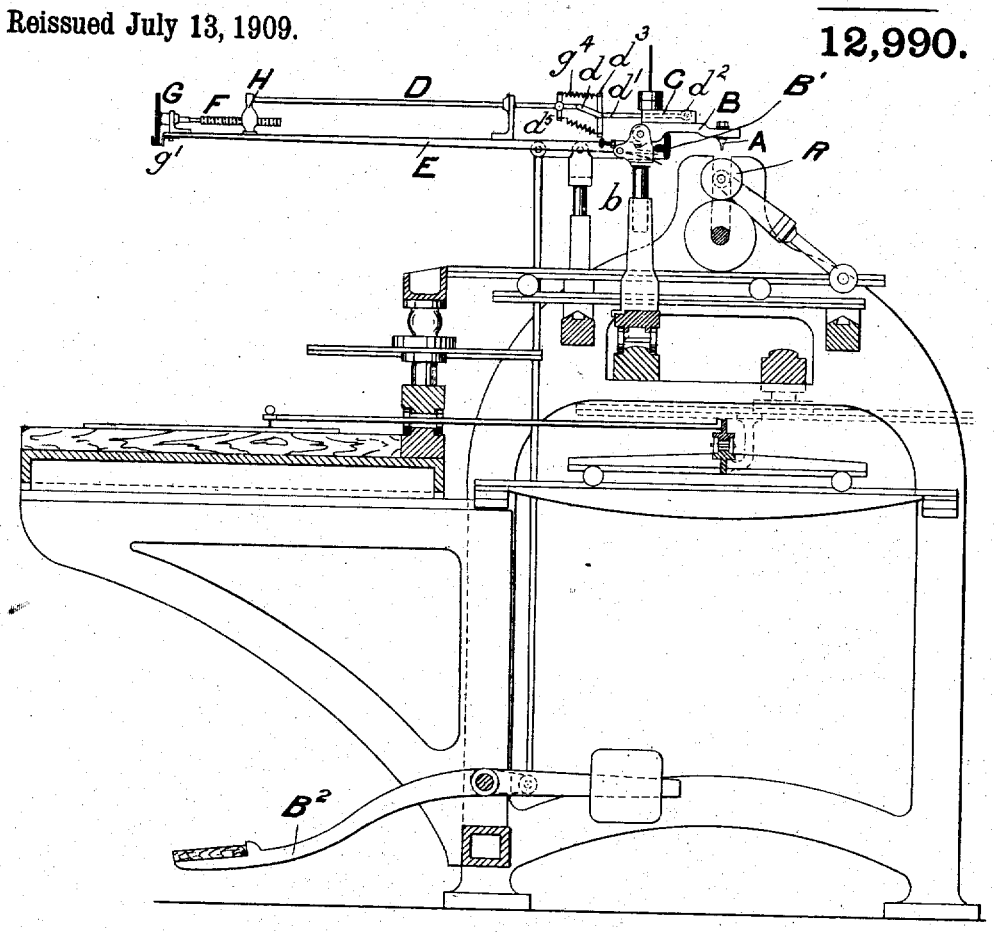
Figure 2:
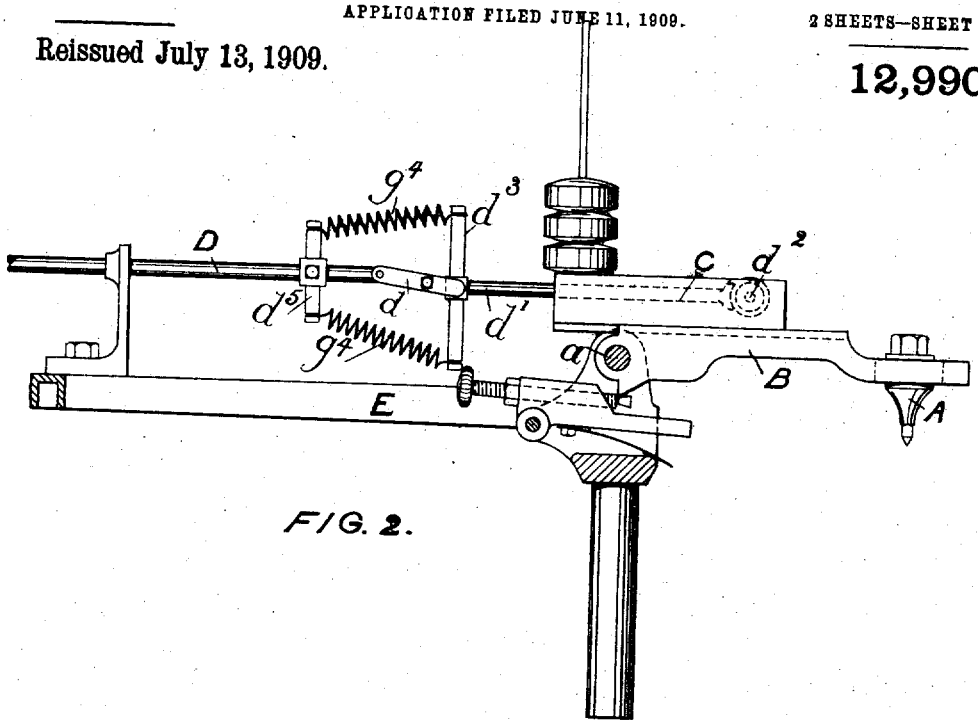
Figure 4:
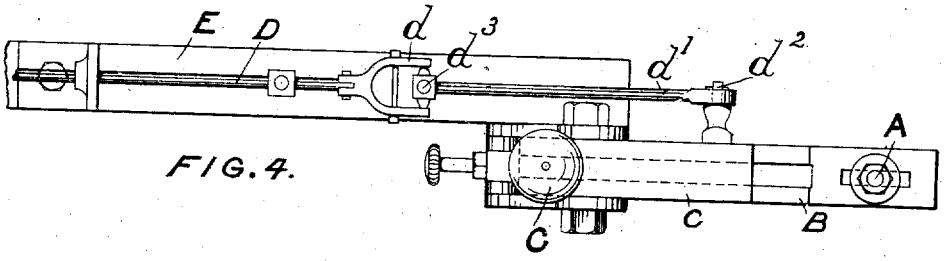
Figure 3:
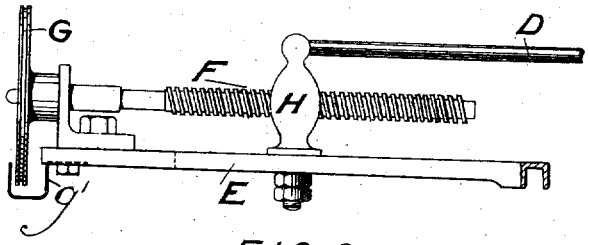
Figure 5:
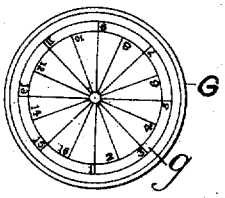

Figure 1. side elevation of a pantograph machine with the invention applied thereto. Fig. 2. side elevation enlarged of the punch mechanism of the pantograph showing the connection therewith. Fig. 3. side elevation of the operating end thereof. Fig. 4. plan of the parts shown in Fig. 2. Fig. 5. end elevation of the hand wheel or knob.

The punch A is mounted in the usual way on a hinged or pivoted bar B upon which a weight C is fitted capable of being moved to or from the punch over the pivot $a$ to increase its effective weight upon the punch. To the punch weight C an adjusting rod D is connected by which the position of the weight C upon the bar B can be altered to give the desired weight or force to the blow of the punch.

The adjusting rod D extends out to the front of the machine to within reach of the hand of the operator so that by moving it he can without rising from his seat and leaving the pattern table of the machine thereby move the weight and adjust its position relatively to the punch to determine a heavier or lighter blow as may be required. It is carried upon a suitable bracket E affixed to the punch bracket $b$ or other part of the machine.

The adjusting rod D is connected to the punch weight C by a double jointed link $d$ and a radius rod $d'$ on a pivot $d^2$. The radius rod $d'$ is fitted at the joint end with a cross bar $d^3$ extending above and below the joint. Springs $g^4$ are attached to the top and bottom ends of the cross bar and to a collar or bar $d^5$ on the adjusting rod D at the other side of the joint to give the desired rigidity to the joint and prevent the link $d$ falling or sagging. A screw F is fitted to the rod D passing through a sliding nut H to which the rod is attached preferably near the front end with a hand wheel or knob G to rotate the screw whereby the rod may be drawn backward or forward to adjust and regulate the punch weight. An index scale $g$ and pointer $g'$ may be applied to the hand wheel G or to the sliding nut H through which the screw passes or otherwise to the rod to indicate the position of the weight on the punch. The engraver without moving from his place at the pattern plate—by turning the screw and moving the rod D can adjust the position of the punch weight C and force of the blow and thereby graduate the shade of the pattern on the die either lighter or darker as required by the pattern.

What we claim as our invention and desire to protect by Letters Patent is:—

1. In a pantograph engraving machine of the type referred to the combination with the punch A, punch arm B and sliding adjustable punch weight C of a rod D pivotally connected with the punch weight extending toward the front of the machine by which the operator can adjust the position of the weight, and a bracket supporting the said rod affixed to the machine substantially as described.

2. In a pantograph engraving machine of the type referred to the combination with the punch A, punch arm B and sliding adjustable punch weight C of a rod D pivotally connected with the punch weight extending toward the front of the machine by which the operator can adjust the position of the weight, a radius rod $d'$ interposed between the rod D and the weight, a double jointed link $d$ connecting the radius rod $d'$ with the adjusting rod D, a cross bar $d^3$ on the end of the radius rod, a collar $d^5$ on the adjusting rod, and springs $g^4$ attached to the said cross bar and collar to give the desired amount of rigidity to the flexible joint substantially as described.

3. In a pantograph engraving machine of the type referred to the combination with the punch A, punch arm B and sliding adjustable punch weight C of a rod D pivotally connected with the punch weight extending toward the front of the machine by which the operator can adjust the position of the weight, the connecting link $d$ the radius rod $d'$ and springs $g^4$ forming a flexible joint, the bracket E to support the adjusting rod D, a movable nut H on the end of the adjusting rod, a screw F engaging therewith by which to operate the rod and a hand wheel G to rotate the screw substantially as described.

4. In a pantograph engraving machine of the type referred to the combination with the punch A, punch arm B and sliding adjustable punch weight C of a rod D pivotally connected with the punch weight extending toward the front of the machine by which the operator can adjust the position of the weight, the connecting link $d$ the radius rod $d'$ and springs $g^4$ forming a flexible joint, the bracket E to support the adjusting rod D, a movable nut H on the end of the adjusting rod, a screw F engaging therewith by which to operate the rod and a hand wheel G to rotate the screw, an index scale $g$ on the hand wheel and a pointer $g'$ affixed to the supporting bracket substantially as described.

In witness whereof, we have hereunto signed our names in the presence of two subscribing witnesses.

JOSEPH TWEEDALE RAWSTHORNE.
JOHN PRYKE.

Witnesses:
J. OWDEN O'BRIEN,
B. TATHAM WOODHEAD.